(12) United States Patent
Chu et al.

(10) Patent No.: US 12,001,772 B2
(45) Date of Patent: Jun. 4, 2024

(54) ULTRA-SHORT-HEIGHT STANDARD CELL ARCHITECTURE

(71) Applicant: International Business Machines Corporation, Armonk, NY (US)

(72) Inventors: Albert Chu, Nashua, NH (US); Junli Wang, Slingerlands, NY (US); Brent Anderson, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 17/485,088

(22) Filed: Sep. 24, 2021

(65) Prior Publication Data

US 2023/0101678 A1    Mar. 30, 2023

(51) Int. Cl.
G06F 30/30     (2020.01)
G06F 30/392    (2020.01)
H01L 27/02     (2006.01)
G06F 111/20    (2020.01)

(52) U.S. Cl.
CPC ........ *G06F 30/392* (2020.01); *H01L 27/0207* (2013.01); *G06F 2111/20* (2020.01)

(58) Field of Classification Search
CPC ............... G06F 30/392; G06F 2111/20; H01L 2027/11881; H01L 27/0207
See application file for complete search history.

(56) References Cited

U.S. PATENT DOCUMENTS

| 6,316,981 | B1 | 11/2001 | Rao et al. |
| 6,355,950 | B1 | 3/2002 | Livengood et al. |
| 8,299,583 | B2 | 10/2012 | Zhu |
| 8,487,444 | B2 | 7/2013 | Law et al. |
| 8,853,799 | B2 | 10/2014 | O'Donnell et al. |
| 8,863,063 | B2* | 10/2014 | Becker ............... H01L 27/0886 716/118 |
| 9,437,588 | B1* | 9/2016 | Zeng ................... H01L 27/0207 |
| 9,673,220 | B1 | 6/2017 | Stamper et al. |
| 10,483,321 | B2 | 11/2019 | Wang et al. |
| 10,734,321 | B2* | 8/2020 | Wang .................... H01L 23/535 |
| 10,878,165 | B2* | 12/2020 | Chang .................. G06F 30/394 |

(Continued)

FOREIGN PATENT DOCUMENTS

| CN | 103518202 B * | 2/2017 | ......... G06F 17/5077 |
| CN | 110349947 A * | 10/2019 | ........... G06F 30/392 |

(Continued)

OTHER PUBLICATIONS

P. Mell et al., "The NIST Definition of Cloud Computing," Recommendations of the National Institute of Standards and Technology, Special Publication 800-145, Sep. 2011, 7 pages.

(Continued)

*Primary Examiner* — Leigh M Garbowski
(74) *Attorney, Agent, or Firm* — Samuel Waldbaum; Ryan, Mason & Lewis, LLP

(57) ABSTRACT

Semiconductor integrated circuit devices are provided which have standard cells with ultra-short standard cell heights. For example, a device comprises an integrated circuit comprising a standard cell which comprises a first cell boundary and a second cell boundary. The standard cell comprises an n-track cell height defined by a distance between the first cell boundary and the second cell boundary, wherein n is four or less.

20 Claims, 10 Drawing Sheets

(56) References Cited

U.S. PATENT DOCUMENTS

| | | | |
|---|---|---|---|
| 11,188,703 B2* | 11/2021 | Huang | G06F 30/394 |
| 11,288,432 B2* | 3/2022 | Chen | G06F 30/30 |
| 11,315,874 B2* | 4/2022 | Tien | H01L 21/823431 |
| 11,423,204 B1* | 8/2022 | Chen | G06F 30/396 |
| 11,537,773 B2* | 12/2022 | Yu | G06F 30/392 |
| 11,545,491 B2* | 1/2023 | Chiu | H01L 29/66795 |
| 11,616,053 B2* | 3/2023 | Smith | H01L 27/0688 257/499 |
| 11,715,733 B2* | 8/2023 | Chen | H01L 23/5226 257/369 |
| 2010/0115484 A1 | 5/2010 | Frederick | |
| 2011/0177658 A1* | 7/2011 | Law | H01L 27/0207 438/129 |
| 2013/0074029 A1 | 3/2013 | Blatchford | |
| 2016/0086932 A1 | 3/2016 | Chen et al. | |
| 2016/0098508 A1* | 4/2016 | Baek | G06F 30/392 716/111 |
| 2017/0358565 A1 | 12/2017 | Hensel et al. | |
| 2018/0218973 A1 | 8/2018 | Nelson et al. | |
| 2018/0374791 A1 | 12/2018 | Smith et al. | |
| 2019/0103392 A1* | 4/2019 | Chang | H01L 27/11807 |
| 2019/0172828 A1* | 6/2019 | Smith | H01L 21/28088 |
| 2020/0266169 A1* | 8/2020 | Kang | H01L 21/76877 |
| 2021/0167066 A1* | 6/2021 | Vishwanath | H01L 23/5286 |
| 2021/0313319 A1* | 10/2021 | Sue | H01L 21/823431 |
| 2021/0358849 A1* | 11/2021 | Chen | H01L 21/823475 |
| 2022/0114320 A1* | 4/2022 | Yu | H01L 23/50 |
| 2022/0130760 A1* | 4/2022 | Wu | H01L 21/823475 |
| 2022/0181258 A1* | 6/2022 | Liebmann | H01L 23/535 |
| 2022/0238442 A1* | 7/2022 | Sio | G06F 30/392 |
| 2022/0262791 A1* | 8/2022 | Shi | H01L 29/785 |
| 2022/0278099 A1* | 9/2022 | Chen | G06F 30/327 |
| 2022/0310584 A1* | 9/2022 | Wu | H01L 27/092 |
| 2022/0336474 A1* | 10/2022 | Liaw | H01L 29/0665 |
| 2022/0359491 A1* | 11/2022 | Chen | G06F 30/394 |
| 2022/0384589 A1* | 12/2022 | Su | H01L 29/78696 |
| 2023/0008866 A1* | 1/2023 | Lai | H01L 25/0657 |
| 2023/0064108 A1* | 3/2023 | Chang | H01L 27/0207 |

FOREIGN PATENT DOCUMENTS

| | | | | |
|---|---|---|---|---|
| DE | 102020110780 B4 * | 3/2023 | | H01L 21/76816 |
| JP | 2011501876 A * | 1/2011 | | |
| TW | 202213160 A * | 4/2022 | | H01L 21/76802 |

OTHER PUBLICATIONS

International Search Report and Written Opinion of PCT/CN2022/103245, Oct. 10, 2022, 9 pages.

J. Ryckaert et al., "Extending the Roadmap Beyond 3nm through System Scaling Boosters: A Case Study on Buried Power Rail and Backside Power Delivery," Electron Devices Technology and Manufacturing Conference (EDTM), 2019, pp. 50-52.

* cited by examiner

100

ULTRA-SHORT-HEIGHT STANDARD CELL ARCHITECTURE

BACKGROUND

This disclosure relates generally to semiconductor technologies and, in particular, to techniques for providing semiconductor technology scale boosting through reduction in standard cell height. Continued innovations in semiconductor process technologies are enabling higher integration densities and device scaling. As the semiconductor industry moves towards the 7-nm technology node and beyond, non-planar semiconductor field-effect transistor (FET) device structures such as nanosheet FET devices, nanowire FET devices, vertical FET devices, Fin-type FET devices, etc., have enabled FET devices to be scaled to smaller dimensions (smaller footprint) while providing increased device width (or FET channel width) and thus, increased drive current, per given footprint area. The scaling of FET devices and other structural-level scaling boosters allows for height reduction of standard cells. However, reduction in cell height leads to a decrease in the number of pin access points for connection to power and signal wiring, which, in turn, can limit block-level area scaling due to poor routeability.

SUMMARY

Embodiments of the disclosure invention include semiconductor integrated circuit devices having standard cells with ultra-short standard cell heights, and methods for designing and constructing semiconductor integrated circuit devices having standard cells with ultra-short standard cell heights.

For example, in one exemplary embodiment, a device comprises an integrated circuit comprising a standard cell which comprises a first cell boundary and a second cell boundary. The standard cell comprises an n-track cell height defined by a distance between the first cell boundary and the second cell boundary, wherein n is four or less.

Another exemplary embodiment includes a device which comprises a substrate, a first interconnect structure, and a second interconnect structure. The substrate comprises an integrated circuit comprising a standard cell. The standard cell comprises a first cell boundary and a second cell boundary, and a three-track cell height defined by a distance between the first cell boundary and the second cell boundary. The first interconnect structure is disposed on a first side of the substrate, and the second interconnect structure is disposed on a second side of the substrate, opposite the first side. The first interconnect structure comprises a first signal track, a second signal track, and a third signal track, which are disposed in parallel within an area of the integrated circuit between the first cell boundary and the second cell boundary of the standard cell. The second interconnect structure is disposed on the second side of the substrate, opposite the first side. The second interconnect structure comprises a fourth signal track, a fifth signal track, a first power distribution track, and a second power distribution track, which are disposed in parallel within the area of the integrated circuit between the first cell boundary and the second cell boundary of the standard cell.

Another exemplary embodiment includes a computer program product, which comprises one or more computer readable storage media, and program instructions collectively stored on the one or more computer readable storage media. The program instructions comprises program instructions to: define a standard cell library comprising a plurality of three-track standard cells, wherein each three-track standard cell comprises a first cell boundary and a second cell boundary, wherein each three-track standard cell comprises a three-track cell height defined by a distance between the first cell boundary and the second cell boundary; and to utilize one of more of the three-track standard cells to generate a layout of a semiconductor integrated circuit device comprising one or more of the three-track standard cells.

Other embodiments will be described in the following detailed description of embodiments, which is to be read in conjunction with the accompanying figures.

DETAILED DESCRIPTION

Figure 1:
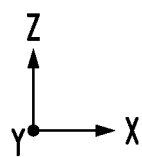
FIG. 1 is a schematic side view of a semiconductor device structure which is configured to implement an integrated circuit with standard cells having an ultra-short standard cell height, according to an exemplary embodiment of the disclosure.
Figure 1:
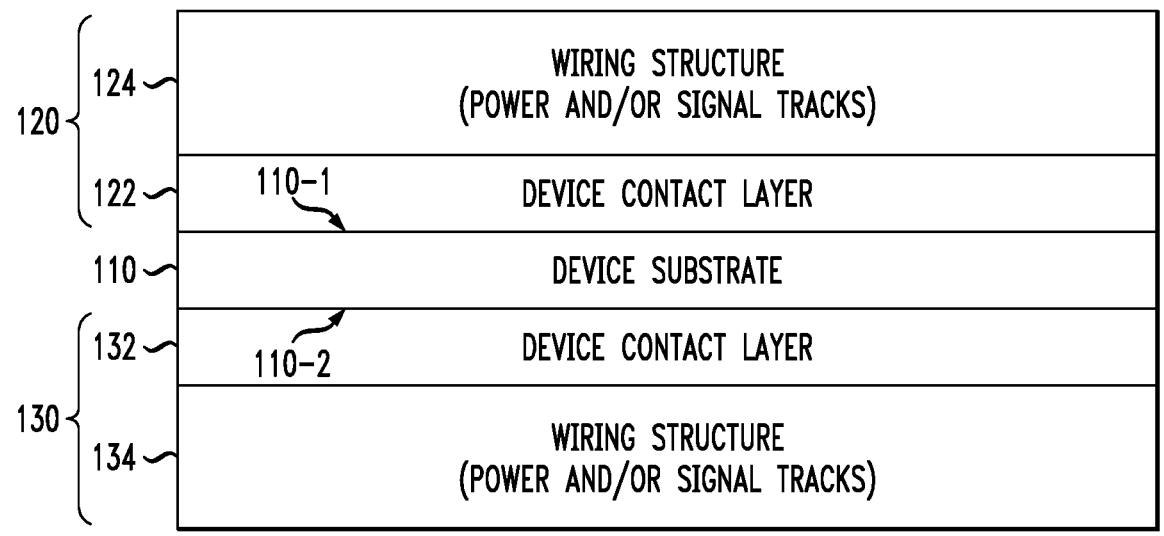

Exemplary embodiments of the invention will now be described in further detail with regard to semiconductor integrated circuit devices having standard cells with ultra-short standard cell heights. For purposes of illustration, exemplary embodiments of the disclosure will be discussed in the context of integrated circuit devices which are configured as standard cells with three-track (or 3-track) cell heights. It is to be understood, however, that the exemplary structures and techniques as disclosed herein can be utilized to implement standard cells with ultra-short cell height other than 3-track cell heights. For example, the exemplary structures and techniques as disclosed herein can be utilized to implement standard cells with an n-track cell height, where in some embodiments, n can be 4 or less (e.g., n=4, 3, 2, or 1).

It is to be understood that the various layers, structures, and regions shown in the accompanying drawings are schematic illustrations that are not drawn to scale. In addition, for ease of explanation, one or more layers, structures, and regions of a type commonly used to form semiconductor devices or structures may not be explicitly shown in a given drawing. This does not imply that any layers, structures, and regions not explicitly shown are omitted from the actual semiconductor structures. Furthermore, it is to be understood that the embodiments discussed herein are not limited to the particular materials, features, and processing steps shown and described herein. In particular, with respect to semiconductor processing steps, it is to be emphasized that the descriptions provided herein are not intended to encompass all of the processing steps that may be required to form a functional semiconductor integrated circuit device. Rather, certain processing steps that are commonly used in forming semiconductor devices, such as, for example, wet cleaning and annealing steps, are purposefully not described herein for economy of description.

Moreover, the same or similar reference numbers are used throughout the drawings to denote the same or similar features, elements, or structures, and thus, a detailed explanation of the same or similar features, elements, or structures will not be repeated for each of the drawings. It is to be understood that the terms "about" or "substantially" as used herein with regard to thicknesses, widths, percentages, ranges, etc., are meant to denote being close or approximate to, but not exactly. For example, the term "about" or "substantially" as used herein implies that a small margin of error is present, such as 1% or less than the stated amount.

The term "exemplary" as used herein means "serving as an example, instance, or illustration". Any embodiment or design described herein as "exemplary" is not to be construed as preferred or advantageous over other embodiments or designs. The word "over" as used herein to describe forming a feature (e.g., a layer) "over" a side or surface, means that the feature (e.g., the layer) may be formed "directly on" (i.e., in direct contact with) the implied side or surface, or that the feature (e.g., the layer) may be formed "indirectly on" the implied side or surface with one or more additional layers disposed between the feature (e.g., the layer) and the implied side or surface.

To provide spatial context to the different structural orientations of the semiconductor structures shown throughout the drawings, XYZ Cartesian coordinates are shown in each of the drawings. The terms "vertical" or "vertical direction" or "vertical height" as used herein denote a Z-direction of the Cartesian coordinates shown in the drawings, and the terms "horizontal," or "horizontal direction," or "lateral direction" as used herein denote an X-direction and/or a Y-direction of the Cartesian coordinates shown in the drawings.

FIG. 1 is a schematic side view of a semiconductor device structure which is configured to implement an integrated circuit with standard cells having an ultra-short standard cell height, according to an exemplary embodiment of the disclosure. More specifically, FIG. 1 schematically illustrates a semiconductor device 100 which comprises a device substrate 110, a first interconnect structure 120, and a second interconnect structure 130. The device substrate 110 comprises a frontside 110-1 (or first side) and a backside 110-2 (or second side). The first interconnect structure 120 is formed on the frontside 110-1 of the device substrate 110, and the second interconnect structure 120 is formed on the backside 110-2 of the device substrate 110. The device substrate 110 comprises a semiconductor substrate having integrated circuit components such as transistors, and other active components, which implement various types of integrated circuits (e.g., logic circuits) formed on an active surface (e.g., frontside 110-1) of the semiconductor substrate. The active devices of the device substrate 110 are formed using front-end-of-line (FEOL) processing modules.

The first interconnect structure 120 comprises a first device contact layer 122 and a first wiring structure 124. The second interconnect structure 130 comprises a second device contact layer 132 and a second wiring structure 134. The first device contact layer 122 comprises various elements such as device contacts (e.g., source, drain, and gate contacts), wiring, and input/output (I/O) pins which provide contacts to the first wiring structure 124. In addition, the first device contact layer 122 comprises elements (e.g., wiring and vias) which are configured to enable connections from the device contacts to the second device contact layer 132. The first wiring structure 124 comprises multiple levels of wiring, and via structures which connect the wiring between different wiring levels. The first wiring structure 124 comprises one or more lower levels of metal lines that are organized in tracks (e.g., signal tracks) to provide local interconnects that distribute clock and other signals to, from, and between the active components of the device substate 110, as well as upper levels of metal lines which comprise semi-global and global wires. In some embodiments, the first wiring structure 124 comprises one or more lower levels of metal lines that are organized in tracks to distribute power (e.g., power distribution tracks) to active components of the device substate 110.

The second device contact layer 132 comprises various elements such as device contacts (e.g., source, drain, and gate contacts), wiring, I/O pins, and power pins, which provide contacts to the second wiring structure 134. More specifically, in some embodiments, the second device contact layer 132 comprises contact elements (e.g., through-silicon vias (TSVs)) which extend through the device substrate 110 and connect to device contacts (e.g., source, drain, and gate contacts) wiring, etc., of the first device contact layer 122. In some embodiments, the second wiring structure 134 comprises at least one level of metal wiring which comprises signal tracks and/or power distribution tracks. The I/O pins of the second device contact layer 132 are connected to the signal tracks of the second wiring structure 134, and the power distribution pins of the second device contact layer 132 are connected to the power distribution tracks of the second wiring structure 134.

The exemplary semiconductor device structure of FIG. 1, which comprises the first and second interconnection structures 120 and 130 formed on the frontside and backside of the device substrates 110, enables cell size scaling to, e.g., a 3-track cell height with sufficient pin access for block level integration. In other words, the utilization of the first and second interconnection structures 120 and 130 provides a scaling booster (e.g., track height scaling) which serves to reduce the circuit area at the standard cell level, by allowing a reduction in the number of metal tracks at the level of local interconnects. As explained in further detail below, exemplary embodiments of the disclosure comprise 3-track standard cell architectures that are configured to connect to signal and power tracks on both top side and bottom sides of standard cells, enabling ultra-short standard cell heights. It is to be noted that the term "cell height" of a standard cell as used herein denotes a number of parallel tracks (e.g., signal tracks and/or power distribution tracks) which are disposed between a first cell boundary and a second cell boundary, wherein a distance between the first and second cell boundaries defines the cell height of a standard cell.

Figure 2:
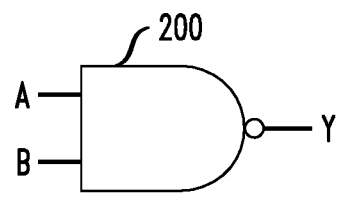
FIG. 2 schematically illustrates a NAND circuit which can be implemented using a standard cell having a 3-track standard cell height, according to an exemplary embodiment of the disclosure.
Figure 2:
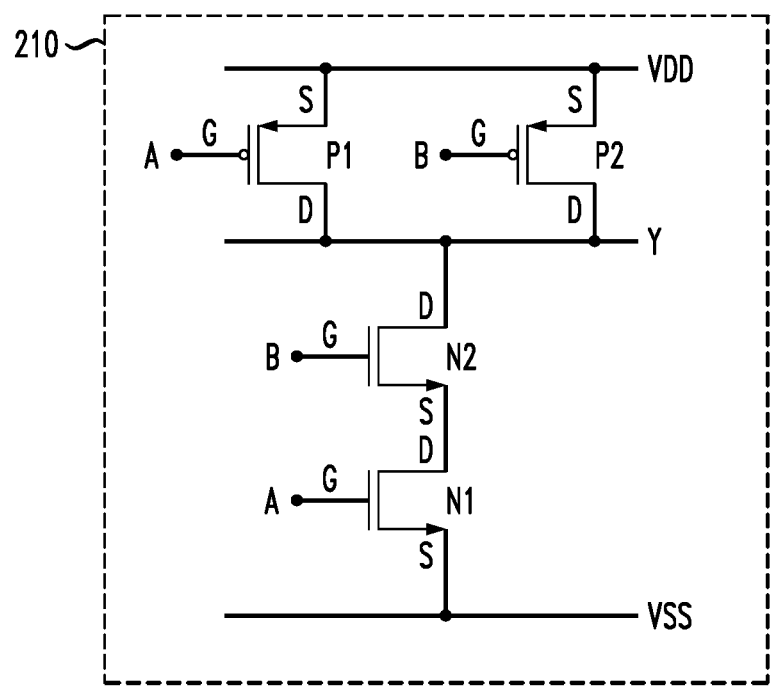

FIG. 2 schematically illustrates a NAND circuit which can be implemented using a standard cell having a 3-track standard cell height, according to an exemplary embodiment of the disclosure. More specifically, as shown in FIG. 2, a NAND logic gate 200 comprises a first input A, a second input B, and an output Y. Further, FIG. 2 schematically illustrates a NAND circuit 210 which comprises a first P-type transistor P1, a second P-type transistor P2, a first N-type transistor N1, and a second N-type transistor N1. In some embodiments, the transistors comprise complementary metal-oxide-semiconductor (CMOS) transistors (NMOS and PMOS transistors). The first and second P-type transistors P1 and P2 have source terminals coupled to first power rail (denoted VDD), and drain terminals coupled to the NAND gate output node Y. The first and second N-type transistors N1 and N2 are serially connected between the output node Y, and a second power rail (denoted VSS). The first input A is coupled to gate terminals of the transistor P1 and N1, and the second input B is coupled to gate terminals of the second transistors P2 and N1.

Figure 3:
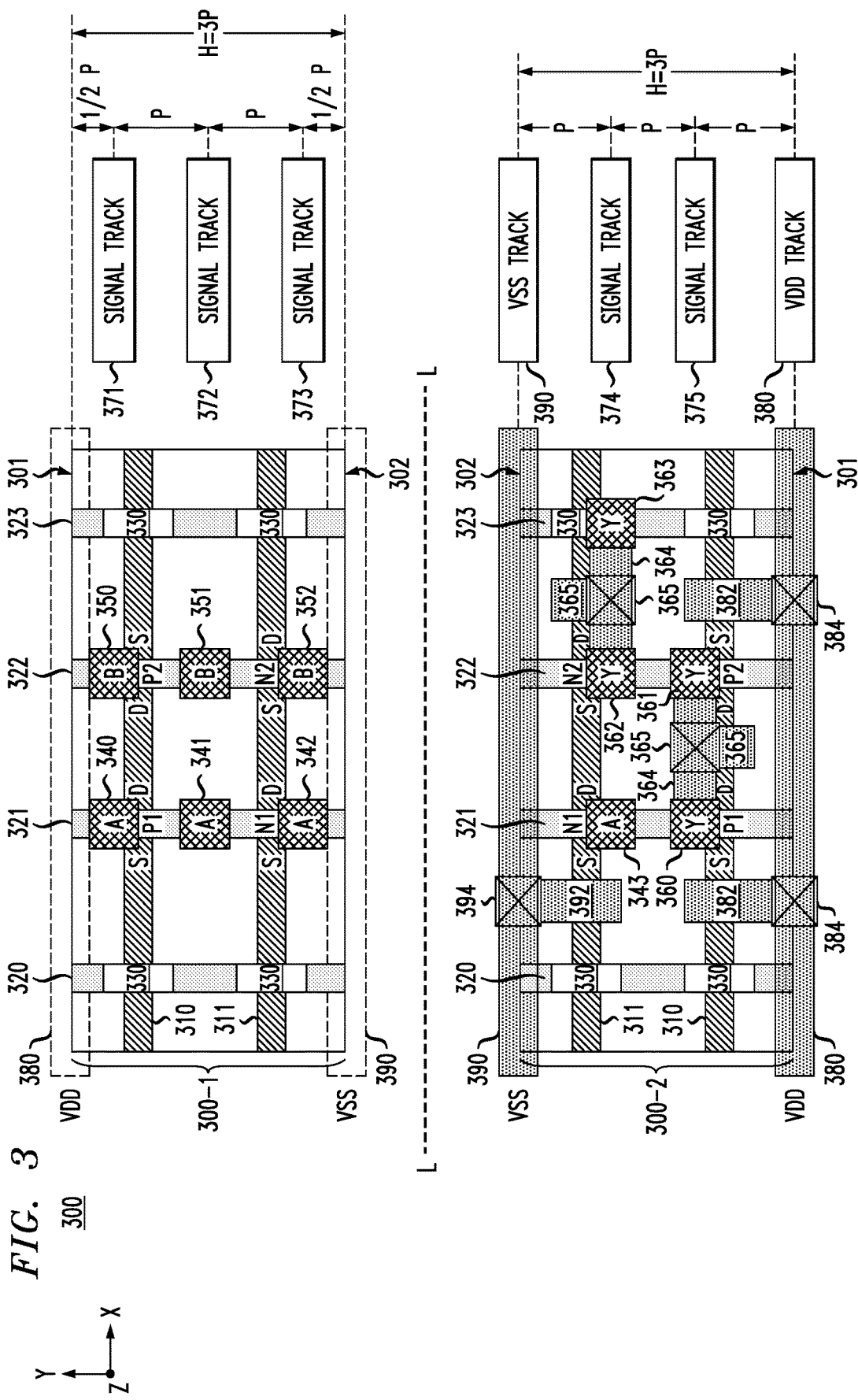
FIG. 3 schematically illustrates a layout of a standard NAND cell having a 3-track standard cell height, according to an exemplary embodiment of the disclosure.

FIG. 3 schematically illustrates a layout of a standard NAND cell having a 3-track standard cell height, according to an exemplary embodiment of the disclosure. More specifically, for purposes of illustration, FIG. 3 schematically illustrates a layout of a standard NAND cell 300 which implements the exemplary NAND circuit 210 of FIG. 2, wherein the PMOS transistors P1 and P2, and the NMOS transistors N1 and N2 comprise Fin-type field-effect transistors (FinFETs) that are implemented using a given technology node (e.g., 7 nm MOSFET technology node). FIG. 3 schematically illustrates a frontside 300-1 (first side) of the standard NAND cell 300, and a backside 300-2 (second side) of the standard NAND cell 300. It is to be understood that the schematic layout of the frontside 300-1 and the backside 300-2 of the NAND cell 300 is shown with the assumption that the backside 300-2 view is obtained by flipping/rotating the frontside 300-1 view about the dashed line L-L shown in FIG. 3.

The NAND cell 300 comprises a first cell boundary 301 and a second cell boundary 302, which define the cell height H, as explained in further detail below. The NAND cell 300 comprises first and second semiconductor fins 310 and 311, and gate structures 320, 321, 322, and 323. The transistors P1, P2, N1, and N2, are formed at overlapping regions where the gate structures 321 and 322 overlap the semiconductor fins 310 and 311. While the first and second semiconductor fins 310 and 311 are each depicted as single structures, it is to be understood that the first semiconductor fin 310 and the second semiconductor fin 311 can each include multiple fins (e.g., 3 fins or more) such that each transistor P1, P2, N1, and N2 comprises a multi-fin transistor structure, as is understood by those of ordinary skill in the art. The gate structures 320 and 323 are dummy gate structures of the NAND cell 300, and include diffusion breaks 330 which are formed to isolate the active portions of the semiconductor fins 310 and 311 from neighboring devices in neighboring cells.

As further shown in FIG. 3, the frontside 300-1 (first side) of the standard NAND cell 300 comprises a plurality of access pins 340, 341, and 342 associated with the first input A of the NAND gate circuit, and a plurality of access pins 350, 351, and 352 associated with the second input B of the NAND gate circuit. The access pins 340, 341, and 342 comprise gate contacts which contact the gate structure 321 for the transistors P1 and N1. The access pins 350, 351, and 352 comprise gate contacts which contact the gate structure 322 for the transistors P2 and N2. In some embodiments, as shown in FIG. 3, the access pins 340, 341, and 342 have centerlines that are aligned to each other, and to a center line of the gate structure 321. Similarly, the access pins 350, 351, and 352 have centerlines that are aligned to each other, and to a center line of the gate structure 322. In some embodiments, the access pins 340, 341, 342, 350, 351, and 352 are elements of, e.g., the first device contact layer 122 (FIG. 1) formed on the frontside of the device substrate 110.

The exemplary layout of the frontside 300-1 of the NAND cell 300 supports a 3-track cell height framework for the NAND cell 300 in which three signal tracks 371, 372, and 373 (which comprise parallel metal interconnect lines in a first metal level (e.g., M1) of a wiring structure (e.g., wiring structure 124, FIG. 1)) can extend through the NAND cell 300 footprint and connect to the access pins between the first and second cell boundaries 310 and 302 of the NAND cell 300. In particular, as shown in FIG. 3, a first signal track 371 is aligned to the access pins 340 and 350, a second signal track 372 is aligned to the access pins 341 and 351, and a third signal track 373 is aligned to the access pins 342 and 352. The three parallel signal tracks 371, 372, and 373 are separated by a given pitch P, wherein the pitch P refers to a minimum center-to-center distance between the signal tracks 371 372, and 373. In some embodiments, the pitch P is 20 nm, although the pitch P will vary depending on the given technology node that is used to design the 3-track standard cells. In addition, as shown in FIG. 3, the signal tracks 371 and 373 have track centerlines that are aligned with a ½ pitch offset from the first and second cell boundaries 301 and 302, respectively. In this layout, the NAND cell 300 comprises a 3-track cell height H, wherein the cell height H is determined to be 3×P (i.e., cell height H=3×P).

Furthermore, the backside 300-2 (second side) of the standard NAND cell 300 comprises an access pin 343 associated with the first input A of the NAND gate circuit, and a plurality of access pins 360, 361, 362, and 363 associated with the output Y of the NAND gate circuit. The access points 360, 361, 362, and 363 are commonly connected by backside wiring 364, and the access points 360, 361, 362, and 363 are connected to the drain terminals D of the transistors P1, P2, and N2 through contact structures 365. The backside 300-2 further comprises wiring 382 and associated contacts 384 that connect the source terminals S of the transistors P1 and P2 to a VDD power rail 380, as well as wiring 392 and an associated contact 394 to connect the source terminal S of the transistor N1 to a VSS power rail 390. In some embodiments, the various access points 343, 360, 361, 362, and 363, wiring, 364, 382, 392, and power contacts 384 and 394, etc., are elements of, e.g., the second device contact layer 132 (FIG. 1) formed on the backside of the device substrate 110.

The exemplary layout of the backside 300-1 of the NAND cell 300 supports the 3-track cell height framework for the NAND cell 300, in which two parallel signal tracks 374 and 375 and two power distribution tracks 380 and 390 (e.g., VDD and VSS power tracks) are formed in a first metal level (e.g., M1) of a wiring structure (e.g., second wiring structure 134, FIG. 1)) and extend through the NAND cell 300 footprint between the first and second cell boundaries 301 and 302 of the NAND cell 300. In particular, as shown in FIG. 3, in some embodiments, the access pins 343, 362, and 363, and the signal track 374 have centerlines that are aligned to each other. In addition, the access pins 360 and 361, and the signal track 375 have centerlines that are aligned to each other. The power contacts 384 and VDD power distribution track have centerlines that are aligned to each other. The power contact 394 and VSS power distribution track have centerlines that are aligned to each other.

For the backside connections, the signal tracks 374 and 375, and power distribution tracks 380 and 380 are separated by a given pitch P, similar to the frontside signal track spacing, thereby providing a cell height H=3, as shown in FIG. 3. The power distribution tracks 380 and 390 have track centerlines that are aligned to the first and second cell boundaries 301 and 302, respectively, such that each power distribution track 380 and 390 is considered to be a "½ track" line, wherein the power distribution tracks 380 and 390 collectively form one (1) track for the backside.

The exemplary NAND cell 300 comprises an ultra-short cell height for a standard cell architecture, while providing a sufficient amount of signal and power pins for frontside and backside routing to enable, e.g., block-level integration. The frontside 300-1 and backside 300-2 of the exemplary NAND cell 300 provides four (4) access points for the first input A, three access points for the second input B, and 4 access points for the NAND output Y. Depending on the configuration, the frontside signal tracks 371, 372, and 373 can be connected to either the A or B access pins, the backside signal track 374 can be connected to either the A access pin or the Y access pin, and the backside signal track 375 can be connected to one or both of the Y access pins. Furthermore, while FIG. 3 illustrates an exemplary embodiment in which the frontside 300-1 comprises three signal tracks, it is to be understood that the frontside 300-1 can be configured to have two signal tracks and two "½ track" power distribution tracks, similar to the backside 300-2.

Figure 4:
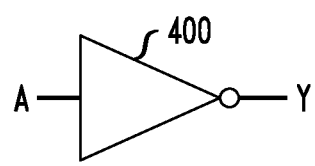
FIG. 4 schematically illustrates an inverter circuit which can be implemented using a standard cell having a 3-track standard cell height, according to an exemplary embodiment of the disclosure.
Figure 4:
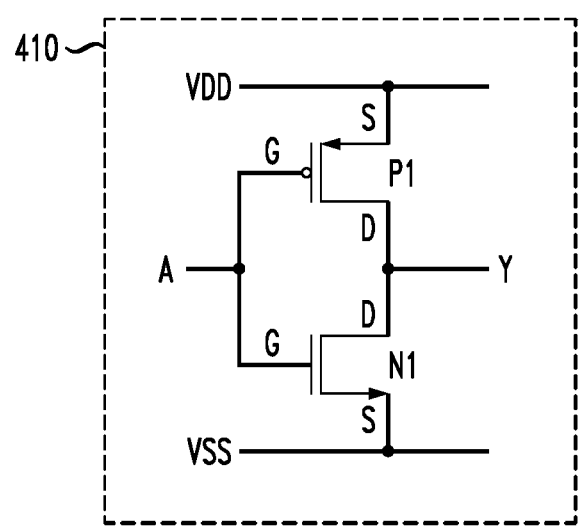

FIG. 4 schematically illustrates an inverter circuit which can be implemented using a standard cell having a 3-track standard cell height, according to an exemplary embodiment of the disclosure. More specifically, as shown in FIG. 4, an inverter 400 comprises a first input A and an output Y. Further, FIG. 4 schematically illustrates an inverter circuit 410 which comprises a P-type transistor P1 and an N-type transistor N1 serially connected between VDD and VSS power rails. In some embodiments, the transistors P1 and N1 comprise PMOS and NMOS transistors having a FinFET framework. The transistors P1 and N1 have commonly connected gate terminals which form the inverter input node A. The transistor P1 has a source terminal coupled to the VDD rail, and a drain terminal coupled to the inverter output node Y. The transistor N1 has a drain terminal coupled to the inverter output node Y, and a source terminal coupled to the VSS power rail.

Figure 5:
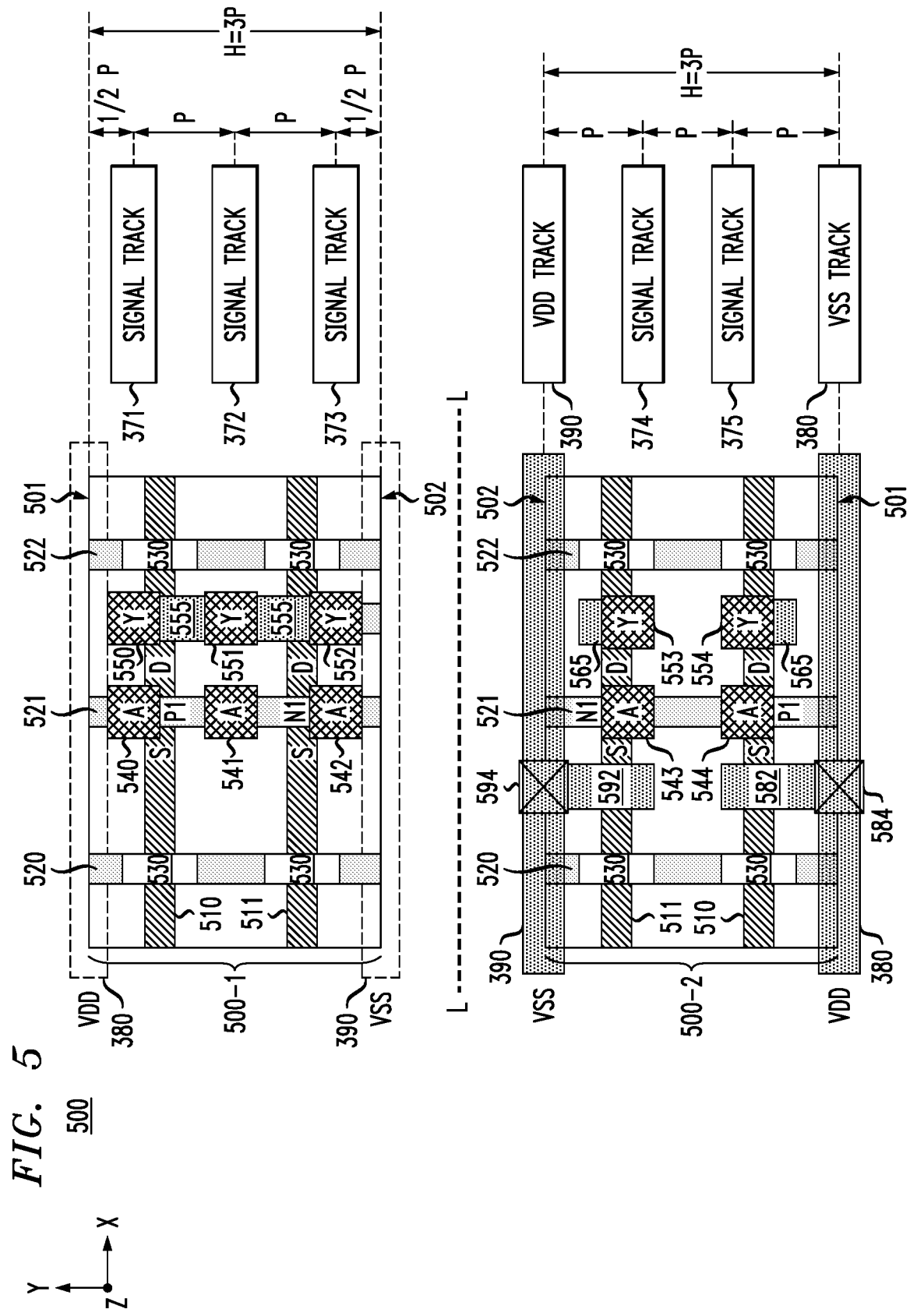
FIG. 5 schematically illustrates a layout of a standard inverter cell having a 3-track standard cell height, according to an exemplary embodiment of the disclosure.

FIG. 5 schematically illustrates a layout of a standard inverter cell having a 3-track standard cell height, according to an exemplary embodiment of the disclosure. More specifically, for purposes of illustration, FIG. 5 schematically illustrates layout of a standard inverter cell 500 which implements the exemplary inverter circuit 410 of FIG. 4, wherein the transistors P1 and N1 comprise FinFET devices that are implemented using a given technology node (e.g., 7 nm MOSFET technology node). FIG. 5 schematically illustrates a frontside 500-1 (first side) of the standard inverter cell 500, and a backside 500-2 (second side) of the standard inverter cell 300. Again, it is to be understood that the schematic layout of the frontside 500-1 and the backside 500-2 of the inverter cell 500 is shown with the assumption that the backside 500-2 view is obtained by flipping/rotating the frontside 500-1 view about the dashed line L-L shown in FIG. 5.

The inverter cell 500 comprises a first cell boundary 501 and a second cell boundary 502, which define the cell height H. Similar to the exemplary NAND cell embodiment of FIG. 3, the exemplary layout of the frontside 500-1 and backside 500-2 of the inverter cell 500 supports a 3-track cell height framework for three parallel signal tracks 371, 372, and 373 on the frontside 500-1, and two parallel signal tracks 374 and 375, and two "½ track" power distribution tracks 380 and 390 on the backside 500-2, providing a cell height H=3P, the details of which will not be repeated.

The inverter cell 500 comprises first and second semiconductor fins 510 and 511, and gate structures 520, 521, and 522. The transistors P1 and N1 are formed at overlapping regions where the gate structure 521 overlaps the semiconductor fins 510 and 511. Again, while the first and second semiconductor fins 510 and 511 are each depicted as single structures, it is to be understood that the first semiconductor fin 510 and the second semiconductor fin 511 can each include multiple fins (e.g., 3 fins or more) such that each transistor P1 and N1 comprises a multi-fin transistor structure, as is understood by those of ordinary skill in the art. The gate structures 520 and 522 are dummy gate structures of the inverter cell 500, and include diffusion breaks 530 which are formed to isolate the active portions of the semiconductor fins 510 and 511 from neighboring devices in neighboring cells.

As further shown in FIG. 5, the frontside 500-1 (first side) of the standard inverter cell 500 comprises a plurality of access pins 540, 541, and 542 associated with the input node A of the inverter cell 500. The access pins 540, 541, and 542 comprise gate contacts which contact the common gate structure 521 for the transistors P1 and N1. In some embodiments, the access pins 540, 541, and 542 have centerlines that are aligned to each other, and to a center line of the gate structure 521. In addition, the frontside 500-1 of the standard inverter cell 500 comprises a plurality of access pins 550, 551, and 552 associated with the output node Y of the inverter cell 500. The access pin 550 is coupled to the drain terminal of the transistor P1, and the access pin 552 is coupled to the drain terminal of the transistor N1. The access pin 551 is disposed in an area between the semiconductor fins 510 and 511, and the access pin 551 is connected to the access pins 550 and 552 by contact/wiring structures 555 to thereby provide a common connection structure for the drain terminals of the transistors P1 and N1.

Furthermore, the backside 500-2 (second side) of the standard inverter cell 500 comprises a plurality of access pins 543 and 544 associated with the input node A of the inverter cell 500, and a plurality of access pins 553 and 554 associated with the output node Y of the inverter cell 500. The access pins 543 and 544 provide backside contacts the gate terminals of the transistors N1 and P1, respectively. The access pins 553 and 554 and associated connection structures 565 provide backside contacts to the commonly connected drain terminals of the transistors N1 and P1. The backside 500-2 further comprises wiring 582 and associated contact 584 structures to connect the source terminal S of the transistor P1 to the VDD power rail 380, as well as wiring 592 and associated contact 594 structured to connect the source terminal S of the transistor N1 to the VS S power rail 390.

The exemplary layout of the inverter cell 500 as shown in FIG. 5 comprises an ultra-short cell height for a standard inverter cell architecture, while providing a sufficient amount of signal and power pins for frontside and backside routing to enable, e.g., block-level integration. The frontside 500-1 and backside 350-2 of the exemplary inverter cell 500 provide five (5) access points for the inverter input node A, and five (5) access points for the inverter output node Y. Depending on the configuration, the frontside signal track 371 can be connected to either the access pin 540 (input A) or the access pin 550 (output Y), the frontside signal track 372 can be connected to either the access pin 541 (input A) or the access pin 551 (output Y), and the frontside signal track 373 can be connected to either the access pin 542 (input A) or the access pin 552 (output Y). Moreover, depending on the configuration, the backside signal track 374 can be connected to either the access pin 543 (input A) or the access pin 553 (output Y), and the backside signal track 375 can be connected to either the access pin 544 (input A) or the access pin 554 (output Y). Furthermore, while FIG. 5 illustrates an exemplary embodiment in which the frontside 500-1 comprises three signal tracks, it is to be understood that the frontside 500-1 can be configured to have two signal tracks and two "½ track" power distribution tracks, similar to the backside 500-2.

Figure 6:
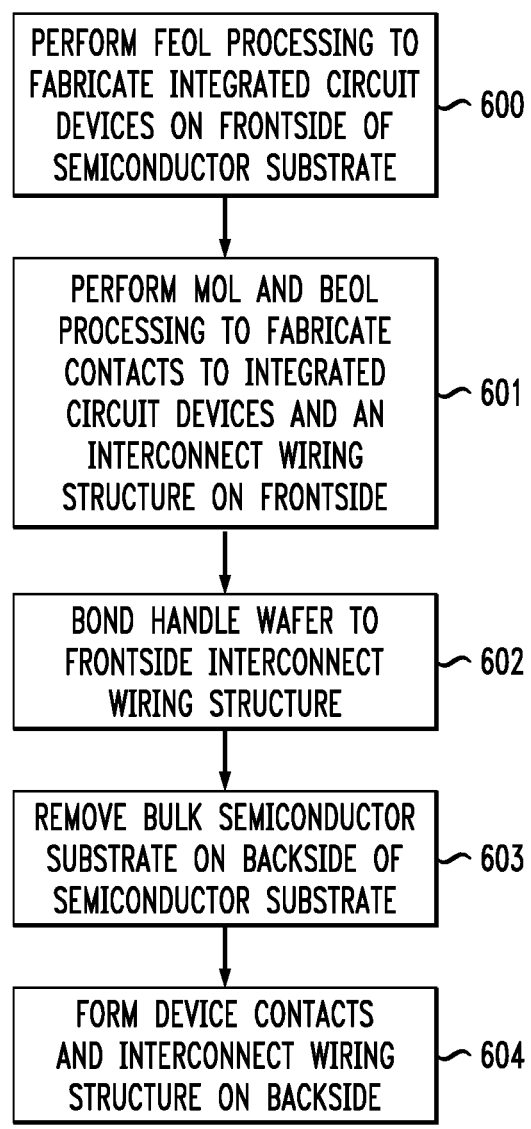
FIG. 6 illustrates a flow diagram of a method for fabricating a semiconductor device which is configured to implement an integrated circuit with standard cells having an ultra-short standard cell height, according to an exemplary embodiment of the disclosure.

FIG. 6 illustrates a flow diagram of a method for fabricating a semiconductor device which is configured to implement an integrated circuit with standard cells having an ultra-short standard cell height, according to an exemplary embodiment of the disclosure. For example, in some embodiments, FIG. 6 illustrates a fabrication process flow which implements various process modules to fabricate an exemplary semiconductor device structure such as shown in FIG. 1. In this regard, FIG. 6 will be discussed in the context of the semiconductor device 100 of FIG. 1. The process comprises performing front-end-of-line (FEOL) processing to fabricate integrated circuit devices on a frontside (active surface) of a semiconductor substrate (block 600).

The semiconductor substrate may comprise a bulk semiconductor substrate formed of, e.g., silicon, or other types of semiconductor substrate materials that are commonly used in bulk semiconductor fabrication processes such as germanium, silicon-germanium alloy, silicon carbide, silicon-germanium carbide alloy, or compound semiconductor materials (e.g., III-V and II-VI). In another embodiment, the semiconductor substrate may comprise a SOI (semiconductor-on-insulator) substrate, which comprises an insulating layer (e.g., oxide layer) disposed between a base substrate layer (e.g., silicon substrate) and an active semiconductor layer (e.g., active silicon layer) in which active circuit components (e.g., field effect transistors) are formed as part of a FEOL layer. The FEOL layer comprises various semiconductor devices and components that are formed in or on the active surface of the semiconductor substrate to construct integrated circuitry which comprise circuit blocks that correspond to, e.g., various 3-track standard cell architectures. In general, FEOL processes typically include preparing the substrate (or wafer), forming isolation structures (e.g., shallow trench isolation), forming device wells, patterning gate structures, forming spacers, forming source/drain regions (e.g., via implantation), forming silicide contacts on the source/drain regions, forming stress liners, etc.

A next phase of the process flow comprises performing middle-of-the line (MOL) and back-end-of-line (BEOL) processing to fabricated device contacts to the integrated circuit devices and an interconnect wiring structure on the active (frontside) of the semiconductor substrate (block 601). For example, in some embodiments, the first device contact layer 122 (FIG. 1) comprises a MOL layer that is fabricated using known methods. For example, MOL processing comprises, e.g., silicidation of source and drain regions, depositing a PMD (pre-metal dielectric layer) over the active surface, forming conductive contacts (e.g., via contacts) in the PMD layer, etc. A pattern of openings is formed in the PMD layer, and the openings are filled with a conductive material, such as tungsten, to form conducive via contacts that are in electrical contact with device terminals (e.g., source/drain regions, gate contacts, etc.) of the integrated circuitry of the FEOL layer. The conductive via contacts of the MOL layer provide electrical connections between the integrated circuitry of the FEOL layer and a first level of metallization of the BEOL structure.

Furthermore, in some embodiments, the wiring structure 124 (FIG. 1) comprises a BEOL structure that fabricated using known methods. As is known in the art, a BEOL structure comprises multiple levels dielectric material and levels of metallization embedded in the dielectric material. The BEOL metallization comprises horizontal wiring, interconnects, pads, etc., as well as vertical wiring in the form of conductive vias that form connections between different interconnect levels of the BEOL structure. A BEOL fabrication process involves successive depositing and patterning of multiple layers of dielectric and metallic material to form a network of electrical connections between the FEOL devices and to provide I/O connections to external components. In some embodiments, the signal tracks 371, 372, and 373 (FIGS. 3 and 5) comprises metallic tracks that are formed as part of the first metallization level (e.g., M0 or M1) of the BEOL structure.

The MOL/BEOL processing (block 601) results in the formation of frontside interconnection structure, e.g., the first interconnect structure 120 (FIG. 1). A next step in the process flow comprises bonding a handler substrate (e.g., handler wafer) to the top-side of the first frontside interconnect structure (block 602) and removing the bulk semiconductor substrate on the backside of the semiconductor substrate (block 603). The backside of the semiconductor substrate can be removed using known techniques such as mechanical grinding, polishing, etching, or any combination of grinding, polishing, and etching. This process results in thinning the semiconductor substrate to enable backside connections to the FEOL circuitry.

Next, device contacts and a wiring structure are formed on the backside of the thinned semiconductor substrate (block 604) to thereby form, e.g., the second interconnect structure 130 (FIG. 1). The process for forming backside device contacts comprises, e.g., patterning the backside surface of the semiconductor substrate to form connection structures to circuit components or contacts formed on the frontside of the semiconductor substrate. In some embodiments, contacts to the backside of the semiconductor substrate are formed as part of the MOL processing, and then such contacts are exposed when the backside of the semiconductor substrate is thinned down. In some embodiments, the second device contact layer 132 is fabricated using techniques that are the same or similar to MOL and/or BEOL processing methods. In some embodiments, the signal tracks 374 and 374, and power distribution tracks 280 and 390 (FIGS. 3 and 5) comprises metallic tracks that are formed as part of the first metallization level of the backside wiring structure 134 (FIG. 1).

Figure 7:
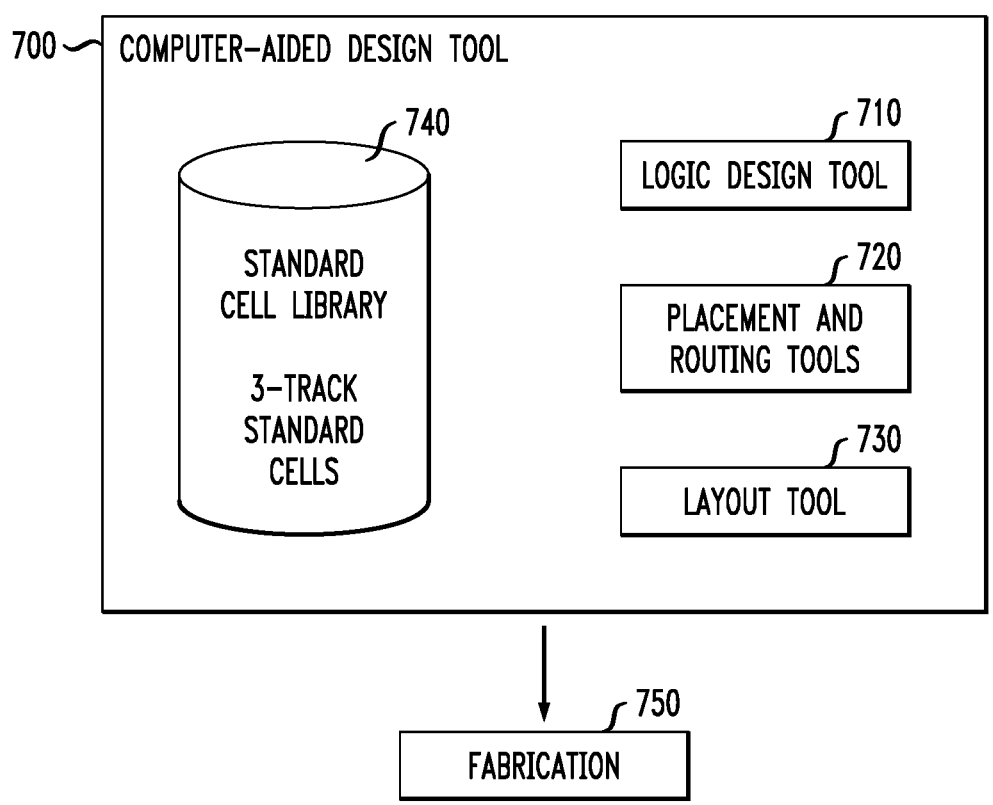
FIG. 7 schematically illustrates a computer-aided design tool which is configured for designing semiconductor integrated circuits using a standard cell library comprising 3-track standard cells, according to an exemplary embodiment of the disclosure.

FIG. 7 schematically illustrates a computer-aided design tool which is configured for designing semiconductor integrated circuits using a standard cell library comprising 3-track standard cells, according to an exemplary embodiment of the disclosure. In particular, FIG. 7 schematically illustrates a computer-aided design (CAD) tool 700 which comprises a logic design tool 710, placement and routing tools 720, a layout tool 730, and a standard cell library 740. The standard cell library 740 comprises a plurality of standard cells for one or more semiconductor technologies, wherein each standard cell comprises a group of transistors and interconnect structures which provides a Boolean logic function (e.g., AND, NAND, OR, NOR, XOR, etc.), a storage functions (e.g., latches, flip-flops, etc.), or more complex standard cells (macro cells) such as adders, multiplexers, memory, etc.). In some embodiments, the standard cell library 740 comprises various types of 3-track standard cells having a 3-track cell height, such as the exemplary NAND cell 300 and inverter cell 500 discussed above.

The logic design tool 710 implements logic synthesis methods to generate a gate level representation (e.g., net list) of a given integrated circuit design using various component cells (e.g., 3-track standard cells) in the standard cell library 740. As is known in the art, a netlist is a nodal description of transistors, of their connections to each other, and of their terminals (ports) to the external environment, which provides a schematic view of the given circuit design. The logic design tool 710 is utilized to generate a net list for a given integrated circuit design based on target logical behaviors and constraints for the given design. In particular, the logic design tool 710 implements logic synthesis techniques and tools which are configured to synthesize a gate-level net list based on a hardware description (e.g., a register transfer level (RTL) file, or any other suitable abstract form of desired circuit behavior), and based on suitable standard component cells selected from the standard cell library 740. The logic design tool 710 will utilize information in a particular library to make appropriate decisions and component selections to build the integrated circuit design.

The logical and netlist views are only useful for abstract (algebraic) simulation, and not device fabrication, whereas the placement and routing tools 720 and the layout tool 730 are utilized to design a physical representation the given integrated circuit comprising standard cells. In particular, the placement and routing tools 730 placement methods that are configured to assign the various library components in the net list to non-overlapping locations on an integrated circuit die area, and construct one or more signal distribution networks to make connections to and between the component logic cells in the integrated circuit design. In particular, the placement tool places the various interrelated component cells of a given logic design in two-dimensional spatial relationship that can be fabricated on a chip, and the routing tool assigns predefined routing tracks which provide signal (interconnect) lines for passing signals between the component cells. For example, in this process, a signal distribution network, such as a clock distribution network or a data signal distribution network, is constructed and added in the integrated circuit design. The routing process adds the wiring which is needed to properly connect the placed component cells while obeying all design rules for the integrated circuit design. Techniques for placement and routing are well known to those of ordinary skill in the art.

The layout tool 730 implements methods that are configured to generate a three-dimensional representation of the actual circuit structures (e.g., regions of doped semiconductor, insulated regions, and metal lines) needed to implement the logic design. The layout tool 730 generates a "layout" view which comprises a lowest level of design abstraction. The layout view essentially provides an actual blue print structure of the given circuit design. The layout comprises base layers which correspond to the different structures of transistor devices, and wiring layers and via layers which form connections to the terminals of the transistor devices.

The layout view generated by the layout tool 730 is used in a fabrication process 750 to fabricate the given integrated circuit.

Exemplary embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
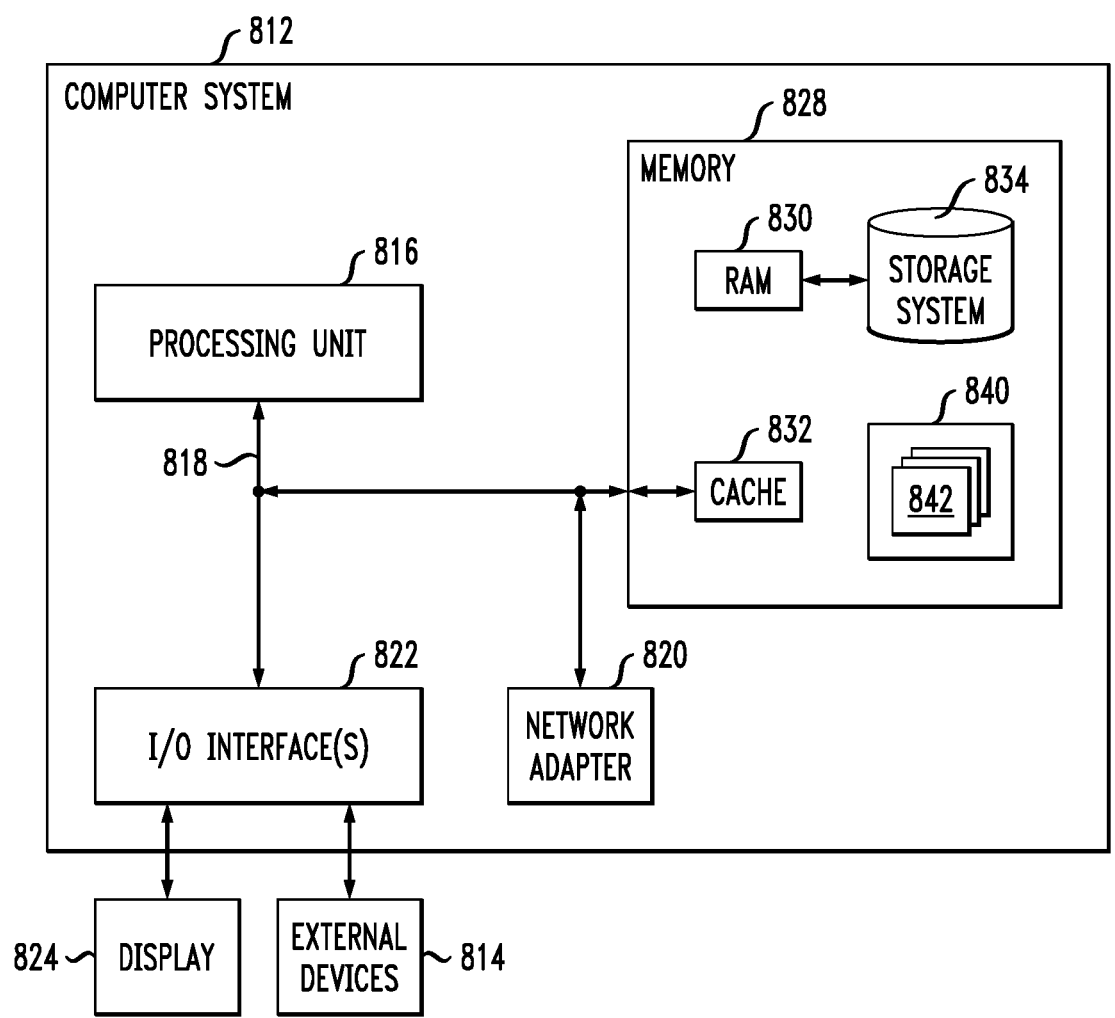
FIG. 8 schematically illustrates an exemplary architecture of a computing node which can host the computer-aided design tool of FIG. 7, according to an exemplary embodiment of the disclosure.

These concepts are illustrated with reference to FIG. 8, which schematically illustrates an exemplary architecture of a computing system which can host the computer-aided design tool of FIG. 7, according to an exemplary embodiment of the disclosure. In particular, FIG. 8 illustrates a computing system 800 which comprises a computer system/server 812, which is operational within numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

In FIG. 8, computer system/server 812 in computing node 800 is shown in the form of a general-purpose computing device. The components of computer system/server 812 may include, but are not limited to, one or more processors or processing units 816, a system memory 828, and a bus 818 that couples various system components including system memory 828 to the processors 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as random-access memory (RAM) 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As depicted and described herein, memory 828 may include at least one program product having a set (e.g., at least one) of program modules that are configured to carry out the functions of embodiments of the invention.

The program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the disclosure as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, SSD drives, and data archival storage systems, etc.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
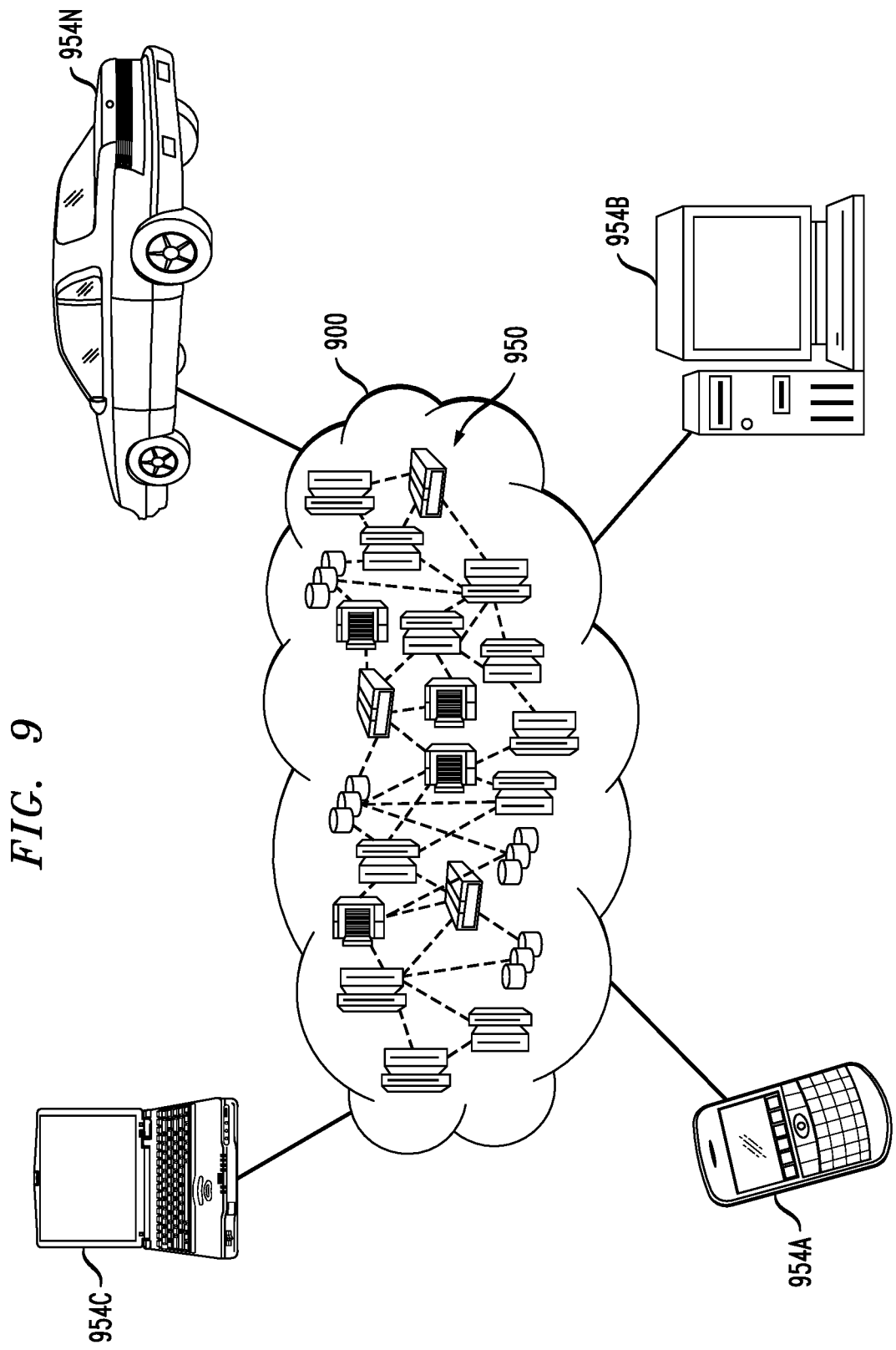
FIG. 9 depicts a cloud computing environment according to an exemplary embodiment of the disclosure.

Referring now to FIG. 9, illustrative cloud computing environment 900 is depicted. As shown, cloud computing environment 900 includes one or more cloud computing nodes 950 with which local computing devices used by cloud consumers, such as, for example, personal digital assistant (PDA) or cellular telephone 954A, desktop computer 954B, laptop computer 954C, and/or automobile computer system 954N may communicate. Nodes 950 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 954A-N shown in FIG. 9 are intended to be illustrative only and that computing nodes 950 and cloud computing environment 900 can communicate with any type of computerized device over any type of network and/or network addressable connection (e.g., using a web browser).

Figure 10:
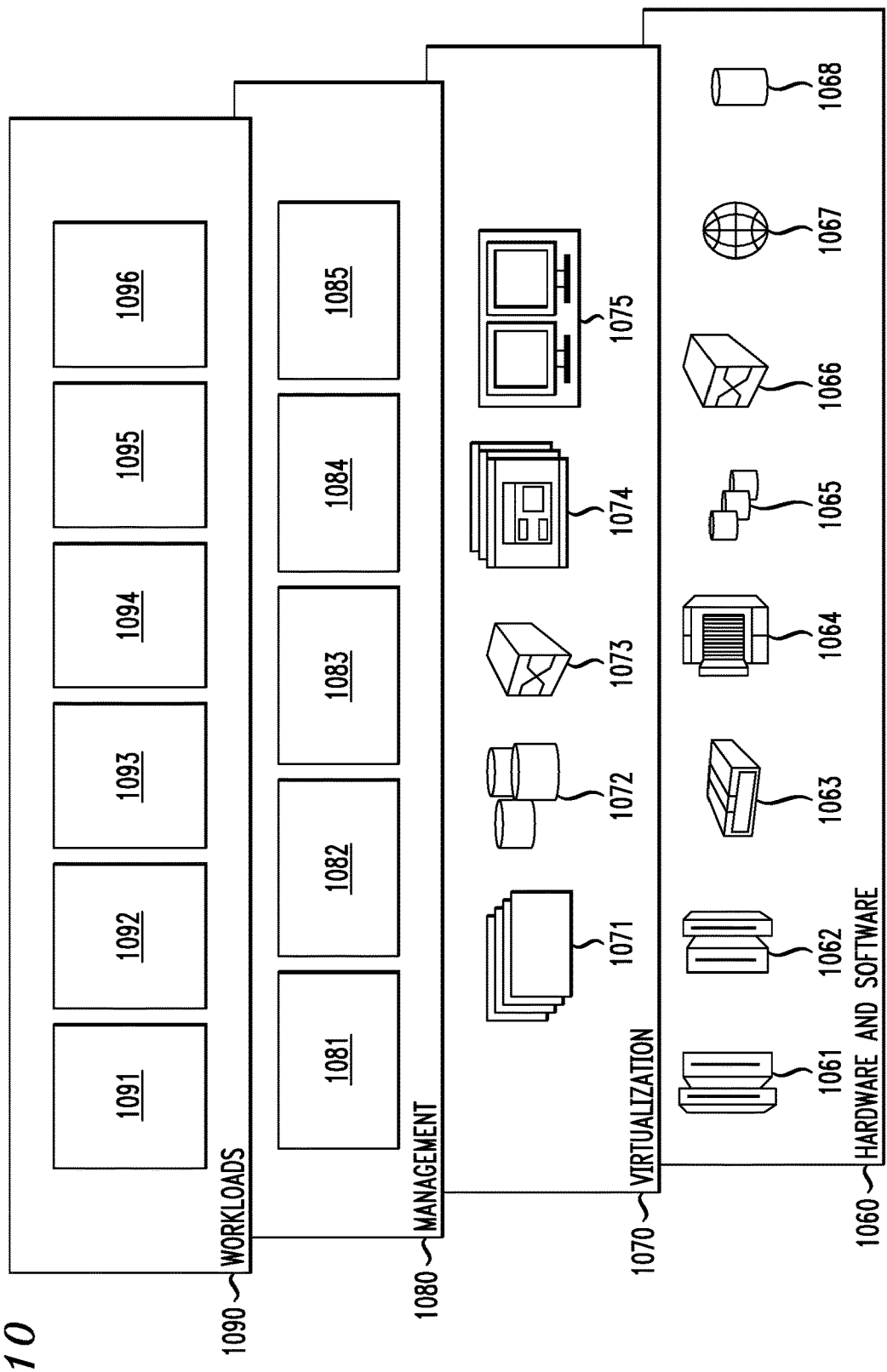
FIG. 10 depicts abstraction model layers according to an exemplary embodiment of the disclosure.

Referring now to FIG. 10, a set of functional abstraction layers provided by cloud computing environment 900 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and various functions 1096 for performing the various functions of the CAD tool 700 of FIG. 7. Furthermore, in some embodiments, the hardware and software layer 1060 would implement, e.g., the CAD tool 700 of FIG. 7 to support, e.g., SaaS.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although exemplary embodiments have been described herein with reference to the accompanying figures, it is to be understood that the invention is not limited to those precise embodiments, and that various other changes and modifications may be made therein by one skilled in the art without departing from the scope of the appended claims.

What is claimed is:

1. A device, comprising:
an integrated circuit comprising a cell which comprises a first cell portion and a second cell portion, wherein;
the first cell portion is disposed on a first side of a substrate, and the second cell portion is disposed on a second side of the substrate, opposite the first side of the substrate, in alignment with the first cell portion;
the first cell portion and the second cell portion of the cell each comprise respective cell boundaries which are aligned to each other on the opposite first and second sides of the substrate, and which define a first cell boundary and a second cell boundary of the cell; and
the cell comprises an n-track cell height defined by a distance between the first cell boundary and the second cell boundary, wherein n is four or less.

2. The device of claim 1, wherein the first cell portion of the cell comprises a first signal track, a second signal track, and a third signal track, which are disposed in parallel within an area of the integrated circuit between the first cell boundary and the second cell boundary of the cell, wherein the cell comprises a three-track cell height.

3. The device of claim 2, wherein:
the first, second, and third signal tracks are separated by a pitch which defines a center-to-center distance between the first, second, and third signal tracks; and
the three-track cell height of the cell is three times the pitch.

4. The device of claim 3, wherein:
the first signal track comprises a track centerline which is aligned with a one-half pitch offset from the first cell boundary;
the second signal track comprises a track centerline which is aligned with a one-half pitch offset from the second cell boundary; and
the third signal track is disposed between the first and second signal tracks.

5. The device of claim 1, wherein the second cell portion of the cell comprises a first signal track, a second signal track, a first power distribution track, and a second power distribution track, which are disposed in parallel within an area of the integrated circuit between the first cell boundary and the second cell boundary of the cell, wherein the cell comprises a three-track cell height.

6. The device of claim 5, wherein:
the first power distribution track comprises a track centerline which is aligned with the first cell boundary;
the second power distribution track comprises a track centerline which is aligned with the second cell boundary; and
the first and second signal tracks are disposed between the first and second power distribution tracks.

7. The device of claim 6, wherein:
the first signal track, the second signal track, the first power distribution track, and the second power distribution track are separated by a pitch which defines a center-to-center distance between the first signal track, the second signal track, the first power distribution track, and the second power distribution track; and
the three-track cell height of the cell is three times the pitch.

8. A device, comprising:
a substrate comprising an integrated circuit comprising a standard cell, wherein the standard cell comprises a first cell boundary and a second cell boundary, wherein the standard cell comprises a three-track cell height defined by a distance between the first cell boundary and the second cell boundary;
a first interconnect structure disposed on a first side of the substrate, wherein the first interconnect structure comprises a first signal track, a second signal track, and a third signal track, which are disposed in parallel within an area of the integrated circuit between the first cell boundary and the second cell boundary of the standard cell; and
a second interconnect structure disposed on a second side of the substrate, opposite the first side, wherein the second interconnect structure comprises a fourth signal track, a fifth signal track, a first power distribution track, and a second power distribution track, which are disposed in parallel within the area of the integrated circuit between the first cell boundary and the second cell boundary of the standard cell.

9. The device of claim 8, wherein:
the first, second, and third signal tracks are separated by a pitch which defines a center-to-center distance between the first, second and third signal tracks;
the fourth signal track, the fifth signal track, the first power distribution track, and the second power distribution track are separated by the pitch; and
the three-track cell height of the standard cell is three times the pitch.

10. The device of claim 9, wherein:
the first signal track comprises a track centerline which is aligned with a one-half pitch offset from the first cell boundary;
the second signal track comprises a track centerline which is aligned with a one-half pitch offset from the second cell boundary; and
the third signal track is disposed between the first and second signal tracks.

11. The device of claim 9, wherein:
the first power distribution track comprises a track centerline which is aligned with the first cell boundary;
the second power distribution track comprises a track centerline which is aligned with the second cell boundary; and
the first and second signal tracks are disposed between the first and second power distribution tracks.

12. The device of claim 11, wherein at least one of the first power distribution track and the second power distribution tracks is shared with at least one other standard cell.

13. The device of claim 8, wherein:
the first interconnect structure comprises a first set of access pins providing connections to terminals of transistor devices of the integrated circuit; and
the second interconnect structure comprises a second set of access pins providing connections to the terminals of transistor devices of the integrated circuit.

14. The device of claim 13, wherein the first set of access pins comprises at least two access pins aligned to the first signal track, at least two access pins aligned to the second signal track, and at least two access pins aligned to the third signal track.

15. The device of claim 13, wherein the second set of access pins comprises at least two access pins aligned to the fourth signal track, and at least two access pins aligned to the fifth signal track.

16. The device of claim 13, wherein the first set of access pins comprise at least two access pins with centerlines aligned to a centerline of an elongated gate structure which provides a common gate structure for at least two transistors.

17. A computer program product, comprising:
one or more computer readable storage media, and program instructions collectively stored on the one or more computer readable storage media, the program instructions comprising:
program instructions to define a standard cell library comprising at least one three-track standard cell which comprises a first cell portion and a second cell portion, wherein the first cell portion is configured to be disposed on a first side of a substrate, and the second cell portion is configured to be disposed on a second side of the substrate, opposite the first side of the substrate, in alignment with the first cell portion, wherein the first cell portion and the second cell portion of the at least one three-track standard cell each comprise respective cell boundaries which are aligned to each other on the opposite first and second sides of the substrate, and which define a first cell boundary and a second cell boundary of the at least one three-track standard cell, wherein the at least one three-track standard cell comprises a three-track cell height defined by a distance between the first cell boundary and the second cell boundary; and
program instructions to utilize the at least one three-track standard cell to generate a layout of a semiconductor integrated circuit device comprising the at least one three-track standard cell.

18. The computer program product of claim 17, further comprising program instructions to generate an interconnect structure comprising a first signal track, a second signal track, and a third signal track, which are disposed in parallel within an area of the first cell portion of the at least one three-track standard cell between the first cell boundary and the second cell boundary of the at least one three-track standard cell, wherein:
the first, second, and third signal tracks are separated by a pitch which defines a center-to-center distance between the first, second and third signal tracks;
the first signal track comprises a track centerline which is aligned with a one-half pitch offset from the first cell boundary;

the second signal track comprises a track centerline which is aligned with a one-half pitch offset from the second cell boundary;

the third signal track is disposed between the first and second signal tracks; and the three-track cell height of the at least one three-track standard cell is three times the pitch.

19. The computer program product of claim 18, wherein the program instructions to generate the interconnect structure comprise program instructions to define a set of access pins providing connections to terminals of transistor devices of the at least one three-track standard cell;

wherein the set of access pins comprises at least two access pins aligned to the first signal track, at least two access pins aligned to the second signal track, and at least two access pins aligned to the third signal track.

20. The computer program product of claim 17, further comprising program instructions to generate an interconnect structure comprising a first signal track, a second signal track, a first power distribution track, and a second power distribution track, which are disposed in parallel within an area of the second cell portion of the at least one three-track standard cell between the first cell boundary and the second cell boundary of the at least one three-track standard cell, wherein:

the first signal track, the second signal track, the first power distribution track, and the second power distribution track are separated by a pitch which defines a center-to-center distance between the first signal track, the second signal track, the first power distribution track, and the second power distribution track;

the first power distribution track comprises a track centerline which is aligned with the first cell boundary;

the second power distribution track comprises a track centerline which is aligned with the second cell boundary;

the first and second signal tracks are disposed between the first and second power distribution tracks;

the three-track cell height of the at least one three-track standard cell is three times the pitch.

\* \* \* \* \*